United States Patent [19]

Csencsits et al.

[11] Patent Number: 4,770,494

[45] Date of Patent: Sep. 13, 1988

[54] LOW-LOSS SILICA OPTICAL WAVEGUIDES

[75] Inventors: Roseann Csencsits, Piscataway; Paul J. Lemaire, West Millington; Katherine T. Nelson, Chester; Kenneth L. Walker, New Providence, all of N.J.

[73] Assignee: American Telephone & Telegraph Company, AT&T Bell Laboratories, Murray Hill, N.J.

[21] Appl. No.: 828,949

[22] Filed: Feb. 12, 1986

[51] Int. Cl.$^4$ .............................................. G02B 6/16
[52] U.S. Cl. ............................. 350/96.34; 350/96.30; 65/3.11
[58] Field of Search ............... 350/96.29, 96.30, 96.31, 350/96.33, 96.34; 65/3.11, 3.12

[56] References Cited

U.S. PATENT DOCUMENTS

| 4,033,667 | 7/1977 | Fleming, Jr. ..................... 350/96.31 |
| 4,217,027 | 8/1980 | MacChesney et al. ............ 350/96.3 |
| 4,229,070 | 10/1980 | Olshansky et al. ............... 350/96.31 |
| 4,251,251 | 2/1981 | Blankenship ....................... 65/3.12 |
| 4,435,040 | 3/1984 | Cohen et al. ..................... 350/96.33 |
| 4,616,901 | 10/1986 | MacChesney et al. .......... 350/96.34 |

OTHER PUBLICATIONS

"Long Wavelength Performance of Optical Fibres Co--Doped with Fluorine", *Electronics Letters*, J. Irven et al., vol. 17, No. 1, 1981, pp. 3-5.

*Primary Examiner*—John Lee
*Attorney, Agent, or Firm*—Peter A. Businger

[57] ABSTRACT

Certain dopant materials, when present in a significant power-carrying portion of a silica-based optical waveguide fiber, are effective as intrinsic loss-reducing agents; the concentration of such dopant materials is at significantly lower levels as compared with levels used for producing a refractive index difference. Suitable in this respect are germania and phosphorus pentoxide as added to essentially pure silica or to silica containing other dopant additives such as, e.g., alumina or fluorine as may be used in a waveguiding core-cladding structure. Intrinsic loss in the vicinity of 0.2 dB/km is readily realized.

15 Claims, 1 Drawing Sheet

LOW-LOSS SILICA OPTICAL WAVEGUIDES

TECHNICAL FIELD

The invention is concerned with optical waveguides as used for optical communications, long-distance communications being of particular interest.

BACKGROUND OF THE INVENTION

The manufacture of optical waveguide fibers has long passed from an early, primarily experimental stage to a fully commercial stage in which a growing number of customers' transmission needs are being satisfied over short and long distances and at various wavelengths corresponding to visible as well as to invisible radiation. The manufacture of commercial fiber typically is based on silica glass technology and involves drawing from a massive body or preform having a cross-sectional refractive index profile as designed for effective guiding of one or several radiation modes.

With respect to most currently used optical fiber, optical waveguide structure can be described in terms of a higer-index core portion which is surrounded by a lower-index portion such as, typically, a glass cladding. At the core-cladding interface there may be a relatively abrupt change in refractive index; alternatively, and especially in the case of fibers designed for the transmission of a plurality of modes, refractive index may decrease gradually towards a fiber surface. A refractive index difference between core and cladding typically results from the addition of one or several suitably chosen dopants or additives to otherwise essentially pure silica; e.g., the addition of boron or fluorine results in a lowered (cladding) refractive index, and the addition of aluminum, germanium, phosphorus, or titanium produces an increased (core) refractive index. With respect to fluorine, germanium, and phosphorus see, e.g., J. Irven et al., "Long-wavelength Performance of Optical Fibers Co-doped with Fluorine", *Electronics Letters*, Vol. 17 (1981), pp. 3-5.

Recently, more elaborate refractive index profiles have been disclosed; for example, U.S. Pat. No. 4,435,040, issued Mar. 6, 1984 to L. G. Cohen et al. discloses so-called W-profile or double-clad optical fibers.

Considerable progress has been made in the development of methods for the manufacture of optical waveguide fiber preforms, and a number of such methods have been found capable of producing preforms from which low-loss fibers can be drawn. One such method is described, e.g., in U.S. Pat. No. 4,217,027, issued Aug. 12, 1980 to J. B. MacChesney et al. Still, and such progress notwithstanding, development efforts continue, e.g., towards further reducing intrinsic loss, such reduction being in the interest of lengthening the distance over which signals can be transmitted without amplification or regeneration.

SUMMARY OF THE INVENTION

Certain dopant materials, when present in silica-basaed glass optical waveguide fibers in amounts which are significantly below amounts used for affecting refractive index, have an intrinsic loss-reducing effect. Intrinsic loss as measured at a wavelength of 1.57 micrometers is less than 0.25 dB/km and preferably less than or equal to 0.20 dB/km, germania and phosphorus pentoxide being included as suitable dopant materials.

DETAILED DESCRIPTION

Figure 1:
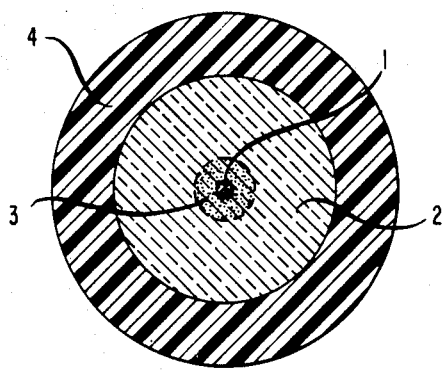
FIG. 1 shows schematically and greatly enlarged a cross-section of a single-mode optical waveguide fiber having reduced intrinsic loss by low-level doping in accordance with the invention.

FIG. 1 shows an optical waveguide comprising a core portion 1, a cladding portion 2, a significant power-carrying portion 3 encompassing the core portion 1 and extending into the cladding portion 2, and a protective coating layer 4. Typical dimensions of such waveguide are a core diameter of approximately 8 micrometers and a cladding diameter of approximately 125 micrometers (this may include an outer cylindrical subportion which does not contribute to waveguiding and which is included for the sake of manufacturing convenience.) Over-all diameter including the protecitve coating typically is approximately 250 micrometers.

While there has been long-standing recognition of the index-modifying influence of dopant additives to silica, the present invention is based not on considerations of refractive index differences and attendant waveguiding but, rather, on an unexpected beneficial influence of certain dopant additives on intrinsic loss of silica-based fiber waveguides. Such waveguides preferably contain at least 90 mole percent silica relative to all cation glass constituents in combination, and loss-reducing dopants in accordance with the invention are present in concentrations which are less than those which have an appreciable influence on waveguiding. The region in which such dopants are present preferably extends past a waveguiding core and into a cladding.

In this respect it is convenient to define a significant power-carrying region of an optical waveguide fiber as a portion of such fiber designed to carry 98 percent or even 99 percent of power when radiation of a desired wavelength is transmitted. In the case of multi-mode fibers, such portion characteristically extends but a small distance into the cladding. On the other hand, in the case of single-mode waveguides, a large portion of power may be transmitted in the cladding; accordingly, a significant power-carrying region may extend into the cladding for a considerable distance.

In these terms, optical waveguides in accordance with the invention have a silica-based significant power-carrying portion comprising germania or phosphorus pentoxide in significant, small amounts resulting in reduced loss as compared with a corresponding fiber not including such germania or phosphorus pentoxide. Germania or phosphorus pentoxide may be emloyed individually or in combination, and germania may be preferred in the interest of maximized stability of optical waveguides in ionizing-radiation environments.

In accordance with the invention, preferred amounts of germania or phosphorus pentoxide were determined to be greater than or equal to 0.02 mole percent and preferably greater than or equal to 0.04 mole percent as based on all cation glass constituents in combination. Preferred amounts do not have an appreciable influence on refractive index, refractive index difference used for waveguiding being due primarily to other factors such as, e.g., the presence of an index-raising dopant other than germania or phosphorus pentoxide in the core or of an index-lowering dopant in a cladding. Accordingly, waveguiding may be due, e.g., to the presence of fluorine in the cladding or to the presence of alumina in the core. (Combined up-doping of a core and down-doping of a cladding is not precluded).

Since a significant power-carrying portion characteristically comprises core as well as cladding regions, constant levels of germania and phosphorus pentoxide across such portion do not appreciably contribute to waveguiding. However, stepping or grading of the concentration of such dopants is not precluded, and it is convenient to specify the contribution of the presence of such dopants to a core-cladding relative refractive index difference as being limited to less than 40 percent and preferably less than 20 percent of such refractive index difference. Also, in the interest of reduced intrinsic loss, these dopants are present in preferred amounts of less than 1.5 mole percent and preferably less than or equal to 1.0 mole percent as based on all cation glass constituents in combination.

Figure 2:
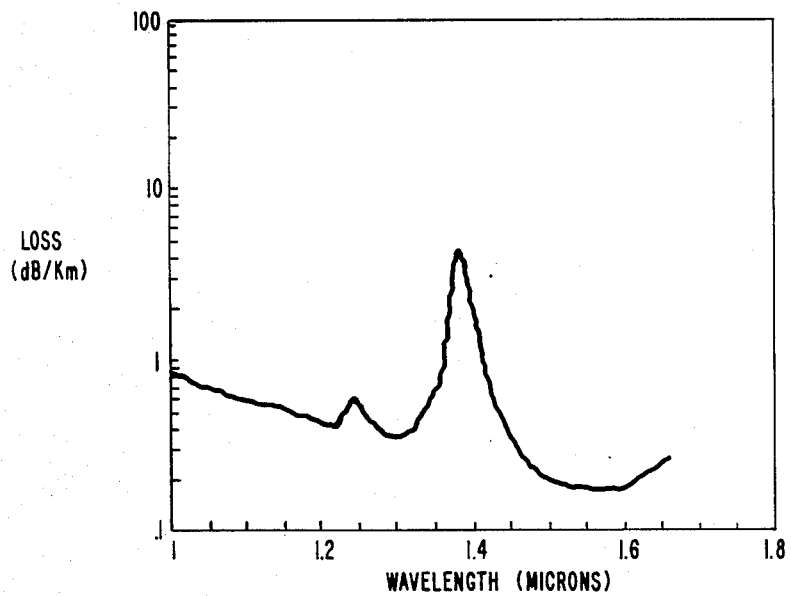
FIG. 2 diagrammatically illustrates intrinsic loss in dB/km as a function of wavelength in micrometers as realized in an embodiment of the invention.

Reduction of intrinsic loss as a result of the addition of germania and phosphorus pentoxide was observed for wavelengths in a range of from approximately 0.6 micrometer to approximately 1.65 micrometers; see FIG. 2 for a graphic representation of intrinsic loss as measured over a domain from 1.0 to 1.65 micrometers for an embodiment of the invention. Over-all lowest loss is at a wavelength of approximately 1.57 micrometers, and such wavelength is conveniently adopted for comparison purposes.

The loss-reducing benefit of the presence of germania or phosphorus pentoxide in accordance with the invention may be attributable to the existance of stable suboxides of germanium and phosphorus at temperatures of approximately 1600 degrees C. and above; as a result, oxygen may become free especially at elevated processing temperatures of approximately 1900 degrees and above during sintering and collapsing. Since such high-temperature processing of silica may result in the formation of reduced silica defects of the form $SiO_{2-x}$, and since such defects are believed to be the cause of increasd intrinsic loss, minute but significant amounts of oxygen given off by germania or phosphorus pentoxide may oxidize the reduced silica defects to silica, $SiO_2$, thereby contributing to reduced intrinsic optical loss.

The following examples are of silica-based single-mode optical fiber waveguides having reduced intrinsic loss by doping in accordance with the invention. In all of the Examples, waveguiding results from a fluorine-doped cladding, fluorine being understood as included in the glass network in a form which may be represented as $SiO_{1.5}F$. In the examples, claddings also comprise a small amount of phosphorus pentoxide, this in the interest of lowering glass transition temperature as well as in the interest of lowering intrinsic loss in accordance with the invention.

Examples 1–4 are of fibers in which a core region is doped with germania; in Example 5, phosphorus pentoxide is included instead. Since, in these fibers, a significant amount of power is transmitted in the cladding, a significant power-carrying portion of the fiber extends considerably past the core portion and into the cladding portion. In all cases, germania or phosphorus pentoxide as included in the core portion serves to reduce intrinsic loss in accordance with the invention.

Manufacture was by an embodiment of a method as described e.g., in the above-cited MacChesney patent. This method involves high-temperature processing especially during sintering and collapsing steps, temperatures exceeding 1900 degrees C. being typical.

Intrinsic loss measurements were carried out by standard measurement techniques as applied to fiber lengths of 1 km or more. Reduced loss may be appreciated in these instances by comparison with a loss of 0.5–2 dB/km obtained at a wavelength of 1.57 micrometers in the case of fibers having an essentially pure silica core and as made while otherwise following essentially the same procedure.

EXAMPLE 1

An optical fiber preform was made by a method as described in the above-cited MacChesney patent. More specifically, a 4-foot-long quartz tube was placed on a lathe, and the interior tube surface was cleaned by freon etching. The tube has an outer diameter of approximately 34 mm and an inner diameter of approximately 30 mm.

For the deposition of fluorine-doped silica cladding glass a flow into the tube was established as follows: Approximately 2.2 l/min oxygen, approximately 3.26 l/min helium, approximately 1.53 l/min silicon tetrafluoride, approximately 12 gm/min silicon tetrachloride, and approximately 0.15 gm/min phosphorus oxychloride. The tube was rotated at a rate of approximately 30 revolutions per minute, and a traveling torch was passed 19 times along a 1-meter-long portion of the tube. Each pass took about 10 minutes. Tube outer-surface temperature was approximately 1975 degrees C. A sintered glass deposit resulted on the interior surface of the tube.

For the deposition of core glass a flow into the the tube was provided as follows: Approximately 1.4 l/min oxygen, approximately 2.25 l/min helium, approximately 1.77 gm/min silicon tetrachloride, and approximately 0.14 gm/min germanium tetrachloride. Tube rotation and speed of the traveling torch remained the same as during the deposition of cladding glass, tube temperature was approximately 2100 degrees C., and a single pass of the torch was used, resulting in the deposition of a layer of core glass.

The resulting preform was collapsed at a temperature of approximately 2350 degrees C. into a rod having a diameter of approximately 12 mm, the optical core portion having a diameter of approximately 1.2 mm. The rod was drawn into a fiber having a thickness of approximately 125 micrometers, and a protective polymeric coating was applied to the cooled fiber, resulting in a coated fiber diameter of approximately 245 micrometers.

The waveguiding cladding portion of the resulting fiber contained approximately 0.4 mole percent phosphorus pentoxide, and the core portion had a germania content of approximately 0.042 mole percent. An intrinsic loss profile was recorded for wavelengths from 1 to 1.65 micrometers; at a wavelength of 1.57 micrometers, loss was found to be approximately 0.178 dB/km.

EXAMPLE 2

An optical fiber preform was made as described above except that the flow of germanium tetachloride was 0.025 gm/min. The core portion of the resulting fiber had a germania content of appoximately 0.081 mole percent. At a wavelength of 1.57 micrometers, intrinsic loss was approximately 0.176 dB/km.

EXAMPLE 3

An optical fiber preform was made as described above except that the flow of germanium tetrachloride was 0.037 gm/min, resulting in a germania content of approximately 0.120 mole percent in the core glass. At a wavelength of 1.57 micrometers, intrinsic loss was approximately 0.180 dB/km.

EXAMPLE 4

Thirty optical fiber preforms were made as described above except that the flow of germanium tetrachloride was 0.167 gm/min, resulting in a germania content of approximately 0.507 mole percent in the core glass. At a wavelength of 1.57 micrometers, median intrinsic loss was approximately 0.19 dB/km.

EXAMPLE 5

An optical fiber preform was made using a silica tube having an outer diameter of approximately 20 mm and an inner diameter of approximately 16 mm. The optical cladding was doped with fluorine and phosphorus, using conditions as follows: Approximately 5 gm/min silicon tetrachloride, approximately 0.035 gm/min phosphorus oxychloride, approximately 0.0754 l/min silicon tetrafluoride, approximately 1.08 l/min oxygen, and approximately 1.96 l/min helium. The tube was rotated at approximately 60 revolutions per minute, and the traveling torch was passed 16 times along a 1.01-meter-long portion of the tube. Each pass took about 6.8 minutes. The tube's outer surface temperature during deposition of the phosphorus-fluorine doped cladding material was approximately 1880 degrees C. The diameter of the cladding in the collapsed preform was approximately 8.5 mm.

For the deposition of the core glass, flow conditions were as follows: Approximately 1.01 gm/min silicon tetrachloride, approximately 0.00706 gm/min phosphorus oxychloride, approximately 0.20 l/min oxygen, and approximately 1.18 l/min helium. Tube rotation and torch traverse speed were the same as for the cladding deposition. The tube surface temperature was approximately 2030 degrees C. during the single pass used for the deposition of the core glass. The diameter of the core in the collapsed preform was approximately 1 mm.

The preform was collapsed at a temperature of approximately 2320 degrees C. resulting in a solid rod. The preform was drawn into a fiber having a diameter of approximately 200 micrometers and a length of approximately 2.5 km; a protective plastic coating was applied. The phosphorus pentoxide content was approximately 0.0027 mole $P_2O_5$ per mole $SiO_2$ in the core as well as in the cladding. Intrinsic loss at a wavelength of 1.57 micrometers was approximately 0.19 dB/km.

What is claimed is:

1. Silica-based optical fiber waveguide comprising a glass core region and a glass cladding region which surrounds said glass core region and which has a refractive index which is lower than the refractive index of said glass core region, a significant power-carrying region of said fiber waveguide here being defined such that, when optical radiation travels in said waveguide, at least 98 percent of the power of said radiation travels in said significant power-carrying region, said waveguide being characterized in that said significant power-carrying region comprises at least one dopant selected from the group consisting of germania and phosphorus pentoxide, said at least one dopant being present in said significant power-carrying region in an amount which is sufficiently small so as not to significantly contribute to waveguiding, said at least one dopant being present in said significant power-carrying region in an amount which is greater than or equal to 0.02 mole percent, and said waveguide having intrinsic loss which is less than 0.25 dB/km at a wavelength of 1.57 micrometers.

2. Waveguide of claim 1 in which said glass regions comprise silica in an amount of at least 90 mole percent.

3. Waveguide of claim 1 in which said dopant contributes less than 40 percent to the relative refractive index difference between said core region and said cladding region.

4. Waveguide of claim 1 in which waveguiding is effected primarily by doping said cladding region.

5. Waveguide of claim 1 in which said cladding region comprises fluorine as an index-decreasing dopant.

6. Waveguide of claim 1 in which waveguiding is effected primarily by doping said core region.

7. Waveguide of claim 1 in which said core region comprises alumina as an index-increasing dopant.

8. Waveguide of claim 1 in which said dopant is germania.

9. Waveguide of claim 1 in which said dopant is phosphorus pentoxide.

10. Waveguide of claim 1 in which said dopant is germania in said core region and phosphorus pentoxide in said cladding region.

11. Waveguide of claim 1, said waveguide being designed for essentially single-mode transmission.

12. Waveguide of claim 1, said waveguide being designed for multi-mode transmission.

13. Waveguide of claim 1, said dopant being present in said glass in an amount of less than 1.5 mole percent.

14. Silica-based optical fiber waveguide comprising a glass core region and a glass cladding region which surrounds said glass core region and which has a refractive index which is lower than the refractive index of said glass core region, a significant power-carrying region of said fiber waveguide here being defined such that, when optical radiation travels in said waveguide, at least 98 percent of the power of said radiation travels in said significant power-carrying region, said waveguide being characterized in that said significant power-carrying region comprises at least one dopant oxide which is such that, at a temperature which is greater than 1900 degrees C., there exists a stable suboxide of the cation of said at least one dopant oxide, said at least one dopant oxide being present in said significant power-carrying region in an amount which is sufficiently small so as not to significantly contribute to waveguiding, said at least one dopant oxide being present in said significant power-carrying region in an amount which is greater than or equal to 0.02 mole percent, and said waveguide having intrinsic loss which is less than 0.25 dB/km at a wavelength of 1.57 micrometers.

15. Waveguide of claim 14 made from a preform whose manufacture involves processing at a temperature which is greater than 1900 degrees C.

* * * * *